US012811248B2

(12) United States Patent
Bae et al.

(10) Patent No.: US 12,811,248 B2
(45) Date of Patent: Nov. 24, 2026

(54) SEPARATOR FOR LITHIUM SECONDARY BATTERY AND METHOD FOR MANUFACTURING THE SAME

(71) Applicant: LG ENERGY SOLUTION, LTD., Seoul (KR)

(72) Inventors: Won-Sik Bae, Daejeon (KR); So-Yeong Lee, Daejeon (KR); So-Jung Park, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 533 days.

(21) Appl. No.: 18/288,283

(22) PCT Filed: Feb. 27, 2023

(86) PCT No.: PCT/KR2023/002746
§ 371 (c)(1),
(2) Date: Oct. 25, 2023

(87) PCT Pub. No.: WO2023/167477
PCT Pub. Date: Sep. 7, 2023

(65) Prior Publication Data
US 2024/0222794 A1 Jul. 4, 2024

(30) Foreign Application Priority Data
Mar. 2, 2022 (KR) ........................ 10-2022-0026842

(51) Int. Cl.
*H01M 2/18* (2006.01)
*H01M 50/403* (2021.01)
*H01M 50/443* (2021.01)
*H01M 50/451* (2021.01)
*H01M 10/0525* (2010.01)

(52) U.S. Cl.
CPC ....... *H01M 50/451* (2021.01); *H01M 50/403* (2021.01); *H01M 50/443* (2021.01); *H01M 10/0525* (2013.01)

(58) Field of Classification Search
CPC ............. H01M 50/451; H01M 50/449; H01M 50/446; H01M 50/403; H01M 50/443; H01M 50/44; H01M 50/409; H01M 10/0525; H01M 10/052
See application file for complete search history.

(56) References Cited

U.S. PATENT DOCUMENTS 10,333,124 B2 * 6/2019 Park .................... H01M 50/489
10,840,493 B2 * 11/2020 Seo ....................... H01M 4/133
2010/0316903 A1 12/2010 Kim et al.
2012/0251869 A1 10/2012 Lee et al.
2013/0084483 A1 4/2013 Lee et al.
2013/0236765 A1 9/2013 Zhang et al.
2014/0186680 A1 * 7/2014 Kim .................... H01M 50/491 429/144
2015/0140403 A1 5/2015 Moon et al.
2015/0171396 A1 6/2015 Okuno
2015/0263324 A1 9/2015 Lee et al.
2017/0018749 A1 1/2017 Sugawara
2017/0069895 A1 3/2017 Okuno
2018/0309108 A1 10/2018 Shin et al.
2019/0020008 A1 1/2019 Kim et al.
2021/0050577 A1 2/2021 Ka et al.
2021/0057700 A1 2/2021 Huang et al.
2021/0242538 A1 8/2021 Lae et al.
2023/0318140 A1 10/2023 Tang et al.
2024/0195013 A1 6/2024 Furusawa et al.

FOREIGN PATENT DOCUMENTS

CN 108352488 A 7/2018
CN 109148798 A 1/2019
CN 111952518 A 11/2020
EP 4 239 781 A1 9/2023
EP 4 322 308 A1 2/2024
JP 2013-187196 A 9/2013
JP WO2013/133025 A1 9/2013
JP 2013-218898 A 10/2013
JP 2014-235835 A 12/2014
JP 2015-99777 A 5/2015
JP 5902692 B2 4/2016
JP 2016-522553 A 7/2016
JP 2017-224634 A 12/2017
JP 2021-48100 A 3/2021
JP 2021-517725 A 7/2021
KR 10-2009-0056811 A 6/2009
KR 10-2012-0035359 A 4/2012
KR 10-2012-0114142 A 10/2012
KR 10-2014-0135956 A 11/2014
KR 10-2015-0025825 A 3/2015
KR 10-2016-0126343 A 11/2016
(Continued)

OTHER PUBLICATIONS

International Search Report (PCT/ISA/210) issued in PCT/KR2023/002746, dated Jun. 12, 2023.
Machine translation of JP-2013-218898-A, published on Oct. 24, 2013.
Extended European Search Report for European Application No. 23763676.6, dated Aug. 11, 2025.
Indian Office Action for Indian Application No. 202317076933, dated Jul. 3, 2026.

*Primary Examiner* — Raymond Alejandro
(74) *Attorney, Agent, or Firm* — Birch, Stewart, Kolasch & Birch, LLP

(57) ABSTRACT

A separator according to the present disclosure includes an organic/inorganic composite porous coating layer on a surface of a porous polymer substrate. The organic/inorganic composite porous coating layer includes a first region comprising a larger amount of inorganic particles and a second region comprising a smaller amount of inorganic particles so that electrolyte wettability is improved by the first region and high adhesion strength with electrode is maintained by the second region.

13 Claims, 5 Drawing Sheets

(56) References Cited

FOREIGN PATENT DOCUMENTS

| | | | |
|---|---|---|---|
| KR | 10-2017-0057761 | A | 5/2017 |
| KR | 10-2018-0023878 | A | 8/2018 |
| KR | 10-2019-0076913 | A | 7/2019 |
| KR | 10-2020-0089995 | A | 7/2020 |

* cited by examiner

SEPARATOR FOR LITHIUM SECONDARY BATTERY AND METHOD FOR MANUFACTURING THE SAME

TECHNICAL FIELD

The present disclosure relates to a separator for a lithium secondary battery and a method for manufacturing the same.

The present application claims priority to Korean Patent Application No. 10-2022-0026842 filed on Mar. 2, 2022 in the Republic of Korea, the disclosure of which is incorporated herein by reference.

BACKGROUND ART

Recently, there is a growing attention to energy storage technology. As the range of application is expanding to energy of mobile phones, camcorders and laptop computers, and even electric vehicles, many efforts have been made to study and develop electrochemical devices. Among many types of electrochemical devices, rechargeable lithium secondary batteries having high operating voltage and high energy density are attracting attention.

The lithium secondary batteries comprise materials capable of intercalation and deintercalation of lithium ions for active materials of positive and negative electrodes, and are manufactured by installing a porous separator between the positive and negative electrodes and injecting a liquid electrolyte, and electricity is produced or consumed through oxidation and reduction reaction by the intercalation and deintercalation of lithium ions at the positive and negative electrodes.

The porous separator includes a polyolefin microporous membrane or a composite separator having a coating layer comprising inorganic particles on the surface of the microporous membrane to improve the mechanical properties and safety.

Meanwhile, suggestions have been made to develop large scale batteries to increase the energy density of the batteries. However, in the case of large scale batteries, the electrolyte solution is not infiltrated into the central region of the battery well, and the region that does not get wet with the electrolyte solution has insufficient movement of lithium ions due to the lack of the electrolyte solution, and in contrast, lithium plating occurs at the region in which lithium ions move intensively. In this circumstance, there is a need for the development of separators with improved electrolyte infiltration even in large scale batteries.

DISCLOSURE

Technical Problem

The present disclosure is directed to providing a separator for an electrochemical device with improved electrolyte wettability and adhesion strength with electrode.

It will be easily understood that the objectives and advantages of the present disclosure may be realized by means or methods set forth in the appended claims and a combination thereof.

Technical Solution

To solve the above-described problem, a first aspect of the present disclosure provides a separator for an electrochemical device according to the following embodiment.

The separator for the electrochemical device according to a first embodiment comprises a porous polymer substrate and a porous organic/inorganic composite coating layer on at least one surface of the porous polymer substrate, wherein the coating layer comprises a first region and a second region, and each of the first region and the second region independently comprises inorganic particles and a binder material, a content ratio of the inorganic particles in the first region according to the following Equation 1 is higher than a content ratio of the inorganic particles in the second region according to the following Equation 2:

$$\text{Content ratio of the inorganic particles in the first region (wt\%)} = [\text{amount of the inorganic particles in the first region}/(\text{amount of the inorganic particles in the first region} + \text{amount of the binder material in the first region})] \times 100, \quad \text{Equation 1}$$

$$\text{Content ratio of the inorganic particles in the second region (wt\%)} = [\text{amount of the inorganic particles in the second region}/(\text{amount of the inorganic particles in the second region} + \text{amount of the binder material in the second region})] \times 100. \quad \text{Equation 2}$$

According to a second embodiment, in the first embodiment, the porous organic/inorganic composite coating layer may have a higher porosity of the first region than the second region.

According to a third embodiment, in the first or second embodiment, the content ratio of the inorganic particles in the first region may be higher than the content ratio of the inorganic particles in the second region, and the content ratio of the inorganic particles in the first region may be 70 wt % or more and 90 wt % or less.

According to a fourth embodiment, in any one of the first to third embodiments, the content ratio of the inorganic particles in the second region may be lower than the content ratio of the inorganic particles in the first region, and the content ratio of the inorganic particles in the second region may be 85 wt % or less.

According to a fifth embodiment, in any one of the first to fourth embodiments, the second region may be present at part of a periphery of the first region such that at least part of a side of the first region may be exposed to the surface, and the second region may be present with its boundary in contact with the first region.

According to a sixth embodiment, in any one of the first to fifth embodiments, the second region may be a single integrated region, or may be divided into two or more units, wherein the units are arranged such that any one unit is spaced apart from the other unit(s).

According to a seventh embodiment, in any one of the first to sixth embodiments, the first region may be present in a rectangular shape on an inner side of the surface of the porous polymer substrate, each unit of the second region may be present on at least one side of the first region and its opposite side, and the second region may not be present on two other sides.

According to an eighth embodiment, in any one of the first to seventh embodiments, the separator may have a rectangular shape having an aspect ratio of more than 1, and the second region may be present on each of two short sides of the separator.

A second aspect of the present disclosure provides an electrochemical device according to the following embodiment.

The electrochemical device according to a ninth embodiment comprises an electrode assembly comprising a positive electrode, a negative electrode and a separator interposed between the positive electrode and the negative electrode, wherein the separator is defined in any one of the first to eighth embodiments.

According to a tenth embodiment, in the ninth embodiment, the electrochemical device may be a lithium ion secondary battery.

A third aspect of the present disclosure provides a method for manufacturing a separator according to the following embodiment.

The method for manufacturing the separator according to an eleventh embodiment is a method for manufacturing the separator defined in any one of the first to eighth embodiments, and the method is performed by a roll-to-roll process of continuously feeding a long strip shaped porous polymer substrate, and comprises forming a second region having a predetermined width at each of two ends in a widthwise direction (TD direction) perpendicular to a transport direction (MD direction) of the polymer substrate, and forming a first region between the second region at each of the two ends to obtain a separator strip comprising the composite coating layer having the first region and the second region.

According to a twelfth embodiment, in the eleventh embodiment, the forming of the first region and second region at each of the two ends may be performed by coating each of a slurry for forming the first region and a slurry for forming the second region on each defined region using a double slot die.

According to a thirteenth embodiment, in the eleventh or twelfth embodiment, the separator strip may be cut into a predetermined width to obtain the separator, and the side of the first region may be exposed through two ends of the porous polymer substrate in the transport direction.

Advantageous Effects

The separator according to an aspect of the present disclosure has the organic/inorganic composite porous coating layer on the surface of the polymer substrate, wherein the organic/inorganic composite porous coating layer includes the first region comprising a larger amount of inorganic particles and the second region comprising a smaller amount of inorganic particles so that electrolyte wettability may be improved by the first region and high adhesion strength with electrode may be maintained by the second region, but the effect of the present disclosure is not limited thereto.

BEST MODE

Figure 1:
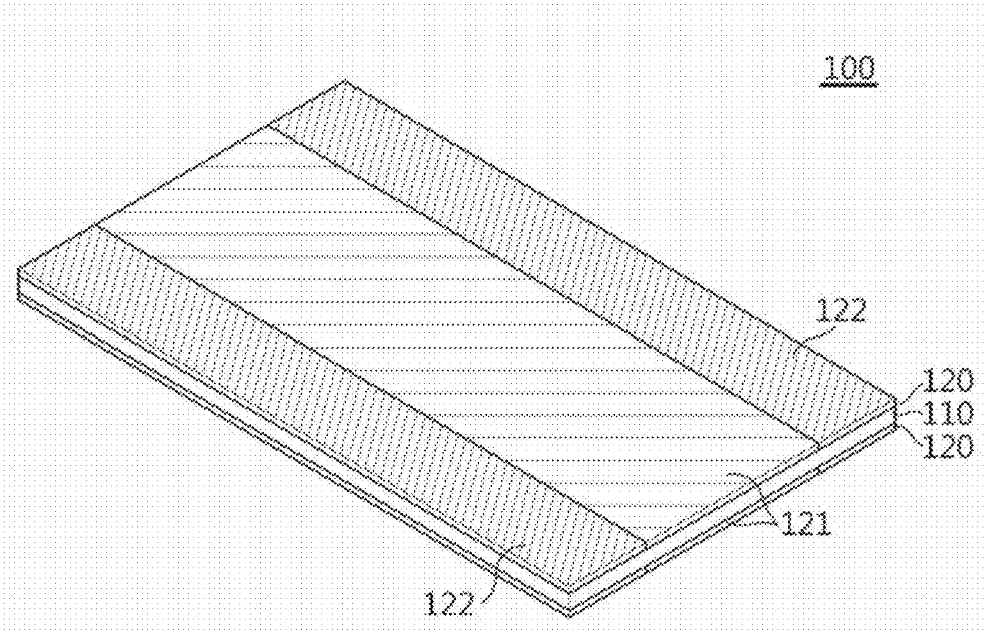
FIG. 1 shows schematically a separator according to the present disclosure.

Hereinafter, the present disclosure will be described in detail. Prior to the description, it should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation. Therefore, the embodiments described herein and illustrations in the accompanying drawings are exemplary embodiments of the present disclosure to describe the technical aspect of the present disclosure and are not intended to be limiting, and thus it should be understood that a variety of other equivalents and modifications could have been made thereto at the time that the application was filed.

It should be further understood that "comprise" when used in the specification, specifies the presence of stated elements, and does not preclude the presence or addition of one or more other elements unless expressly stated otherwise.

Throughout the specification, A and/or B refers to either A or B or both.

An aspect of the present disclosure relates to a separator for an electrochemical device.

The electrochemical device is a device that converts chemical energy to electrical energy by electrochemical reaction, and includes primary batteries and secondary batteries. Additionally, the secondary batteries can be charged and discharged, and include lithium ion batteries, nickel-cadmium batteries, nickel-hydrogen batteries and the like.

In the present disclosure, the separator acts as a porous ion-conducting barrier that allows ions to pass through while preventing electrical contact between negative and positive electrodes in the electrochemical device. The separator has a plurality of pores, and preferably, the pores are connected to each other to allow gas and/or liquid to pass from a side of the separator to its opposite side.

The separator 100 according to an aspect of the present disclosure comprises a porous polymer substrate 110 having a plurality of pores, and the polymer substrate 110 comprises a polymer material. Additionally, the separator has a porous organic/inorganic composite coating layer (hereinafter, the coating layer 120) on at least one surface of the polymer substrate 110.

In an embodiment of the present disclosure, the coating layer may comprise inorganic particles and a binder material, and the inorganic particles may be bonded by the binder material into a layered structure. The coating layer has a porous structure resulting from spaces (interstitial volume) between the inorganic particles. The separator's capacity to hold the electrolyte solution may be improved by the porous structure.

In an embodiment of the present disclosure, the coating layer may be 3 vol % to 40 vol % based on the total volume 100 vol % of the separator, and along with this or independently of this, the thickness of the coating layer may be 5% to 50% based on the total thickness 100% of the separator.

In an embodiment of the present disclosure, the polymer substrate is a sheet type porous membrane comprising the polymer material and having the plurality of pores. For example, the polymer substrate may comprise one or more sheets of at least one selected from a porous polymer film and a nonwoven fabric. The pores include open pores, and the open pores are connected to each other to allow gas and/or liquid to pass from a side of the polymer substrate to its opposite surface.

In an embodiment of the present disclosure, the polymer substrate may have air permeability of 2000 sec/100 cc or less and porosity of 30 vol % to 60 vol % in terms of output and cycling characteristics of the battery. Meanwhile, in the present disclosure, the polymer substrate may have a pore diameter in a range between 10 nm and 100 nm.

In the present disclosure, the air permeability refers to the time (sec) required for 100 ml of air to pass through the polymer substrate or the separator of 1 square inch in size under the constant air pressure of 4.8 inches. The air permeability may be, for example, measured using Asahi seiko's EG01-55-1MR.

In the present disclosure, the porosity refers to a fraction of voids in a structure over the total volume and is indicated in vol %, and may be used interchangeably with void fraction, degree of porosity or the like. In the present disclosure, the measurement of the porosity is not limited to a particular method, and for example, the porosity may be measured by Brunauer-Emmett-Teller (BET) measurement method using nitrogen gas or Hg porosimeter according to an embodiment of the present disclosure. Alternatively, in an embodiment of the present disclosure, the net density of an object may be calculated from the density (apparent density) of the object, the composition ratio of the constituent elements included in the object and the density of each constituent element, and the porosity of the object may be calculated from a difference between the apparent density and the net density.

In an embodiment of the present disclosure, the polymer substrate may be 5 μm to 20 μm in thickness to reduce the thickness of the electrochemical device and increase the energy density. When the thickness of the polymer substrate is below the above-described range, the function of the conducting barrier is insufficient, and when the thickness of the polymer substrate is too much beyond the above-described range (that is to say, the polymer substrate is too thick), the resistance of the separator may increase so much.

In an embodiment of the present disclosure, the polymer material may preferably comprise a thermoplastic resin having the melting point of 200° C. or less to provide a shut-down function. The polymer material may comprise at least one of polyolefin-based resins. The shut-down function refers to a function of polymer resin that melts in the event of a temperature rise of the battery, to clog the pores of the polymer substrate to block the ion transport between the positive electrode and the negative electrode, thereby preventing thermal runaway of the battery.

The polyolefin-based resin may comprise, for example, at least one selected from the group consisting of polyethylene, polypropylene, polybutene and polypentene. In particular, the polyolefin-based resin may be polyethylene and/or polypropylene. Additionally, in addition to the polyolefin-based resin, the polymer material may further comprise at least one polymer resin selected from polyethyleneterephthalate, poly buty leneterephthalate, polyacetal, polyamide, polycarbonate, polyimide, polyetheretherketone, polyethersulfone, polyphenylene oxide, polyphenylene sulfide and polyethylenenaphthalene.

Subsequently, the inorganic particles and the binder material included in the coating layer of the separator will be described.

In an embodiment of the present disclosure, the inorganic particles are not limited to a particular type and may include any type of inorganic particle having the particle size that is smaller than a desired thickness of the coating layer, for example, the particle size corresponding to ½ to 1/1,000 of the thickness of the coating layer, and having electrochemical stability. For example, the diameter of the inorganic particles may be 10 nm or more. Meanwhile, for example, the diameter of the inorganic particles may be 10 μm or less, 7 μm or less, 5 μm or less, 2 μm or less, or 1 μm or less. That is, the inorganic particles are not limited to a particular type and may include any type of inorganic particle that does not cause oxidation and/or reduction reaction at the operating voltage range (for example, 0 to 5 V vs Li/Li+) of the electrochemical device applied. In particular, the use of inorganic particles having the ability to transport ions may increase the ionic conductivity in the electrochemical device, thereby contributing to the improved performance. Additionally, the use of inorganic particles having high dielectric constant may contribute to the increased solubility of an electrolyte salt, for example, a lithium salt in the liquid electrolyte, thereby improving the ionic conductivity of the electrolyte solution.

By the above-described reasons, in a specific embodiment of the present disclosure, the inorganic particles may comprise at least one of high dielectric constant inorganic particles having the dielectric constant of 5 or more or 10 or more, or inorganic particles having the ability to transport lithium ions. Non-limiting examples of the inorganic particles having the dielectric constant of 5 or more may include at least one of $BaTiO_3$, $Pb(Zr,Ti)O_3$ (PZT), $Pb_{1-x}La_xZr_{1-y}Ti_yO_3$ (PLZT, where 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC or $TiO_2$. In particular, the inorganic particles such as $BaTiO_3$, $Pb(Zr,Ti)O_3$ (PZT), $Pb_{1-x}La_xZr_{1-y}Ti_yO_3$ (PLZT, where 0<x<1, 0<y<1), $Pb(Mg_{1/3}Nb_{2/3})O_3$—$PbTiO_3$ (PMN-PT), hafnia ($HfO_2$) may exhibit high dielectric constant characteristics having the dielectric constant of 100 or more, and have piezoelectricity where a potential difference occurs between two surfaces due to electric charges generated when stretched or compressed by the application of a predetermined pressure, thereby preventing internal short circuit of the two electrodes in the event of external impacts, which contributes to the improved safety of the electrochemical device. Additionally, when the high dielectric constant inorganic particles and the inorganic particles having the ability to transport lithium ions are used together, their synergistic effect may be magnified.

In a specific embodiment of the present disclosure, the inorganic particles having the ability to transport lithium ions refer to inorganic particles that contain lithium but do not store lithium and have the function to transport lithium ions, and since the inorganic particles having the ability to transport lithium can ions transport and move lithium ions due to a sort of defect present in the particle structure, it may be possible to improve the conduction of lithium ions in the battery, thereby contributing to the improved battery performance. Non-limiting examples of the inorganic particles having the ability to transport lithium ions may include at least one of lithium phosphate ($LisPO_4$), lithium titanium phosphate ($Li_xTi_y(PO_4)_3$, 0<x<2, 0<<3), lithium aluminum titanium phosphate ($Li_xAl_yTi_z(PO_4)_3$, 0<x<2, 0<y<1, 0<<<3), (LiAlTiP)×Oy based glass (0<x<4, 0<y<13) such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5)

such as $Li_{3.25}Ge_{0.25}P_{0.75}S_4$, lithium nitride ($Li_xN_y$, 0<x<4, 0<y<2) such as $Li_3N$, $SiS_2$ based glass ($Li_xSi_yS_z$, 0<x<3, 0<<2, 0<z<4) such as $Li_3PO_4$—$Li_3S$—$SiS_2$ or $P_2S_5$ based glass ($Li_xP_yS_z$, 0<x<3, 0<y<3, 0<z<7) such as LiI—$Li_2S$—$P_2S_5$.

In an embodiment of the present disclosure, non-limiting examples of the binder material that may be used in the coating layer may include at least one polymer resin selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethylsucrose, pullulan and carboxyl methyl cellulose, but is not limited thereto.

Meanwhile, in the separator according to an embodiment of the present disclosure, the coating layer may be divided into a first region and a second region, each of the first region and the second region may independently comprise the inorganic particles and the binder material, and a content ratio of the inorganic particles in the first region according to Equation 1 may be preferably higher than a content ratio of the inorganic particles in the second region according to Equation 2.

$$\text{Content ratio of the inorganic particles in the first region (wt \%)} = [\text{amount of the inorganic particles in the first region}/(\text{amount of the inorganic particles in the first region} + \text{amount of the binder material in the first region})] \times 100 \quad \text{[Equation 1]}$$

$$\text{Content ratio of the inorganic particles in the second region (wt \%)} = [\text{amount of the inorganic particles in the second region}/(\text{amount of the inorganic particles in the second region} + \text{amount of the binder material in the second region})] \times 100 \quad \text{[Equation 2]}$$

FIG. 1 shows the layout of the separator 100 according to an embodiment of the present disclosure. Referring to FIG. 1, the first region 121 having a high content ratio of the inorganic particles is disposed, part of the side of the first region is exposed, and the second region 122 having a low content ratio of the inorganic particles is disposed on two opposite sides of the first region.

When the separator according to the present disclosure comprising the coating layer 120 having the first region and the second region is provided to manufacture the electrode, it may be possible to accelerate the electrolyte infiltration into the battery through the first region, and together with the above-described feature, it may be possible to achieve high adhesion strength between the separator and the electrode through the second region having a higher amount of the binder material than the first region.

In an embodiment of the present disclosure, the content ratio of the inorganic particles in the first region may be higher than the content ratio of the inorganic particles in the second region, and may be 70 wt % or more, 75 wt % or more, or 80 wt % or more. Meanwhile, the amount of the inorganic particles may be 90 wt % or less within the above-described range. Meanwhile, in an exemplary embodiment of the present disclosure, the first region preferably comprises the binder resin in an amount of more than 10 wt %. In case that the amount of the binder resin is below the above-described range, it is difficult to ensure adhesion strength between the separator and the electrode necessary to maintain shape stability and durability of the electrode assembly. In an embodiment of the present disclosure, the content ratio of the inorganic particles in the second region may be smaller than the content ratio of the inorganic particles in the first region, and may be less than 90 wt %, 89 wt % or less, 85 wt % or less, or 80 wt % or less, or 75 wt % or less. In an embodiment of the present disclosure, the amount of the inorganic particles in the first region may be more than 75 wt % and the amount of the inorganic particles in the second region may be 75 wt % or less. Alternatively, the amount of the inorganic particles in the first region may be more than 80 wt % and the amount of the inorganic particles in the second region may be 80 wt % or less.

Meanwhile, in an embodiment of the present disclosure, as the amount of the inorganic particles is larger, the porosity may be higher, and accordingly the porosity of the first region may be higher than the porosity of the second region. Meanwhile, the air permeability (sec/100 cc) of the first region may be lower than that of the second region.

Subsequently, various embodiments of the coating layer will be described by way of illustration. However, the disclosed embodiments are provided to help understanding of the present disclosure but not intended to limit the scope of the present disclosure.

In an embodiment of the present disclosure, the second region is preferably disposed at part of the periphery of the first region such that at least part of the side of the first region is exposed. Additionally, the second region is disposed with its boundary in contact with the first region. In the separator according to the present disclosure, the first region of the coating layer is disposed to accelerate the electrolyte infiltration. Since the first region comprises a small amount of the binder resin and a large amount of the inorganic particles, the first region has lower adhesion or bonding strength with electrode than the second region. Since the second region has higher bonding strength between the separator and the electrode than the first region, the electrolyte infiltration may be impeded. By this reason, the electrolyte infiltration through the first region is faster and easier than the infiltration through the second region. Since the upper surface and the lower surface of the separator are in contact with the electrode when manufacturing the battery, the electrolyte infiltration takes place through the side of the separator. Accordingly, in case where the entire periphery of the first region is surrounded by the second region, i.e., when all the sides of the first region are coated by the second region, it is difficult to accelerate the electrolyte infiltration.

Additionally, in an embodiment of the present disclosure, the second region may be a single integrated region. In another embodiment, the second region may be divided into two or more units and any one unit may be spaced apart from the other unit(s). Meanwhile, when the second region comprises a plurality of divided units arranged spaced apart from each other, it may be possible to ensure uniform adhesion strength with electrode over the entire separator.

In a specific embodiment of the present disclosure, the first region may be disposed in a rectangular shape on the inner side of the surface of the polymer substrate, and each unit of the second region may be disposed on any one side of the first region and its opposite side, and the second region may not be disposed on the two other sides. When the second region is disposed as described above, the electrolyte infiltration may be accelerated through the side of the first region in which the second region is not disposed and the electrode and the separator may be bonded by high adhesion strength at two ends of the separator in the widthwise direction or lengthwise direction. In an embodiment of the present disclosure, in view of electrolyte infiltration, when the separator has a rectangular shape having the aspect ratio of more than 1, the second region may be disposed on each of two short sides of the separator such that the long sides of the separator are exposed. In an embodiment of the present disclosure, the separator may be manufactured in a long strip shape with a longer length in MD direction than the length in TD direction as described below, and the second region may be formed on the long side of the separator strip in the manufacturing process. Alternatively, the fabricated separator strip may be cut into a predetermined width through a tool, for example, a cutter to obtain the separator, and the obtained separator may be used to assemble the battery, and the separator of a rectangular shape which is short in the MD direction and long in the TD direction may be provided finally (in the manufacturing process). In this instance, the second region may be disposed on the short side of the manufactured separator.

FIG. 1 shows schematically the separator according to an embodiment of the present disclosure. Referring to FIG. 1, the first region is formed in a rectangular shape having four sides, and the second region is disposed at part of the periphery of the first region. More specifically, the second region includes two units, and one of the two units is disposed in contact with any one side of the first region and the remaining unit is disposed in contact with the opposite side. Additionally, the remaining two sides of the first region having no second region are exposed.

Figure 2:
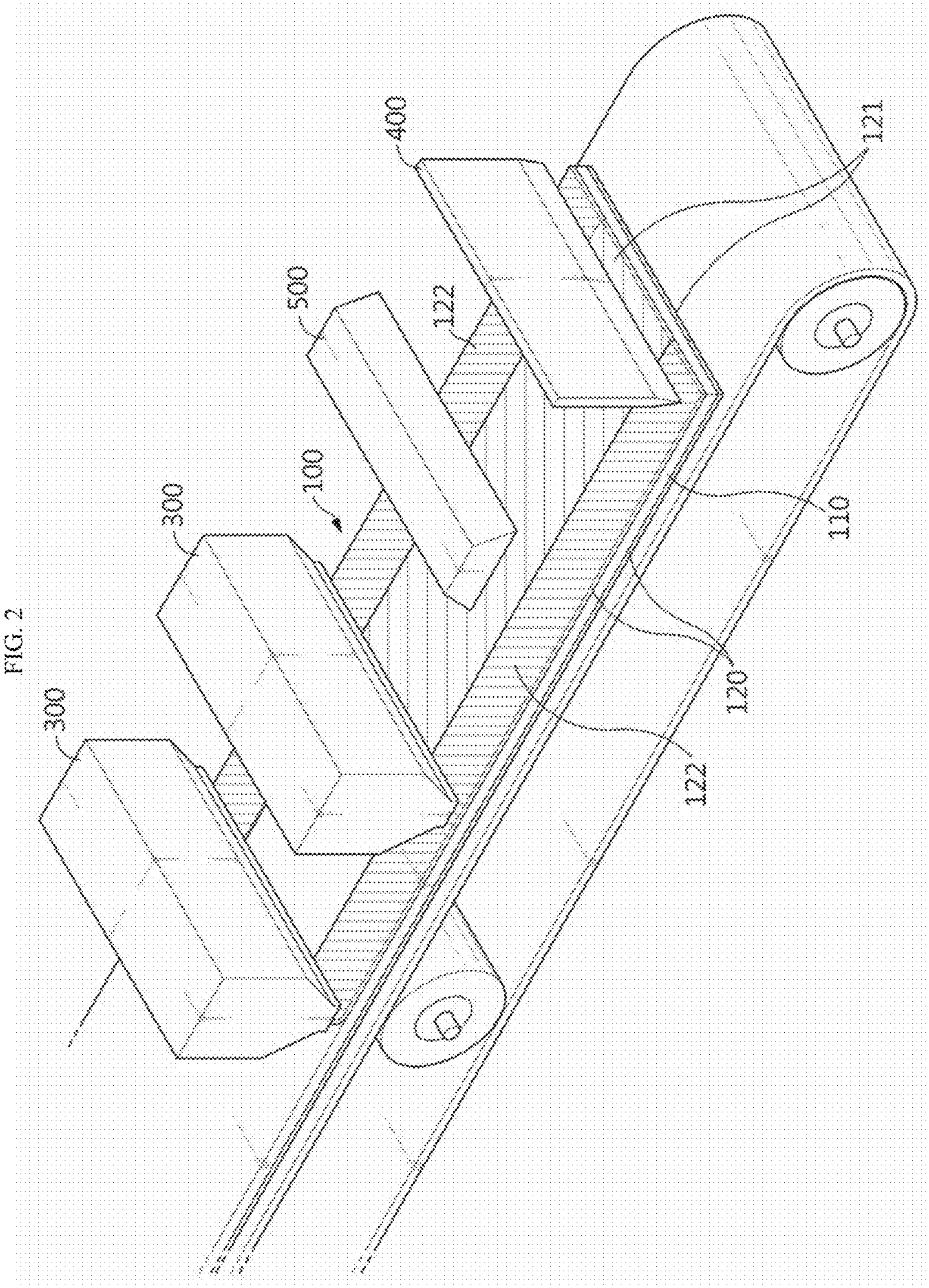
FIG. 2 shows schematically a method for manufacturing a separator according to the present disclosure.

FIG. 2 shows schematically a method for manufacturing the separator according to an embodiment of the present disclosure. The method for manufacturing the separator will be described with reference to FIG. 2.

The separator may be manufactured by a roll-to-roll type continuous process. Referring to FIG. 2, the long strip shaped polymer substrate 110 is continuously fed by rotating rolls of a roll-to-roll machine, and a coating layer slurry is coated on the surface of the polymer substrate. The coating of the slurry may be performed through a commonly used coater 300, for example, a slot die. Meanwhile, the slurry may be prepared for each of a slurry for forming the first region and a slurry for forming the second region, and each slurry may be prepared by adding the inorganic particles and the binder material to a suitable solvent.

When each slurry is prepared, the slurry for forming the second region is coated on the two ends in the widthwise direction (TD direction) perpendicular to the transport direction (MD direction) of the polymer substrate, and the slurry for forming the first region is coated between the second regions. The coating of the slurries for forming the first and second regions may be simultaneously performed using a double slot die, or may be performed in a sequential order by coating one of the slurries for forming the first and second regions and then coating the other slurry. For example, the slurry for forming the first region may be coated on a predetermined location of the inner side of the polymer substrate and the slurry for forming the second region may be coated on the two ends in the widthwise direction in which the slurry of the first region is continuously coated.

Subsequently, the coated slurry may be dried to obtain the separator strip comprising the composite coating layer having the first region and the second region. The drying may be performed by heat or wind while passing through a dryer 500. Subsequently, the separator strip is cut into the predetermined width using the tool, for example, the cutter 400 to obtain the separator, and in this instance, in the obtained separator, the side of the first region is exposed through the two ends of the polymer substrate in the MD direction.

According to another aspect of the present disclosure, there is provided an electrochemical device comprising the above-described separator for a lithium secondary battery interposed between positive and negative electrodes.

In an embodiment of the present disclosure, the electrochemical device may be a lithium ion secondary battery.

In a specific embodiment of the present disclosure, the electrochemical device may be manufactured by injecting a nonaqueous electrolyte solution, if necessary, into an electrode assembly comprising the positive electrode, the negative electrode, and the separator interposed between the positive electrode and the negative electrode, stacked in a sequential order. In this instance, the positive electrode and the negative electrode of the electrode assembly and the nonaqueous electrolyte solution may include any known type commonly used to manufacture the lithium secondary battery.

In a specific embodiment of the present disclosure, the positive electrode may be manufactured by forming a positive electrode material layer on a positive electrode current collector. The positive electrode material layer may be formed by coating a positive electrode slurry comprising a positive electrode active material, a binder, a conductive material and a solvent on the positive electrode current collector, drying and rolling.

In a specific embodiment of the present disclosure, the positive electrode current collector may include, without limitation, any type of material having conductive properties without causing any chemical change to the battery, for example, stainless steel, aluminum, nickel, titanium, sintered carbon, or aluminum or stainless steel treated with carbon, nickel, titanium or silver on the surface.

In a specific embodiment of the present disclosure, the positive electrode active material may include a compound (a lithiated intercalation compound) capable of reversible intercalation and deintercalation of lithium.

In a specific embodiment of the present disclosure, the positive electrode active material may include, for example, at least one of lithium transition metal oxide; lithium metal iron phosphate oxide; lithium nickel-manganese-cobalt oxide; or oxide with partial substitution by other transition metal in lithium nickel-manganese-cobalt oxide, but is not limited thereto. Specifically, the positive electrode active material may include, for example, layered compounds such as lithium cobalt oxide ($LiCoO_2$), lithium nickel oxide ($LiNiO_2$) or compounds with one or more transition metal substitution; lithium manganese oxide of formula $Li_{1+x}Mn_{2-x}O_4$ (where x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni site lithium nickel oxide represented by formula $LiNi_{1-x}M_xO_2$ (where M=Co, Mn, Al, Cu, Fe, Mg, B or Ga, x=0.01 to 0.3); lithium manganese composite oxide represented by formula $LiMn_{2-x}M_xO_2$ (where M=Co, Ni, Fe, Cr, Zn or Ta, x=0.01 to 0.1) or $Li_2Mn_3MO_8$ (where M=Fe, Co, Ni, Cu or Zn); lithium metal phosphate oxide $LiMPO_4$ (where M=Fe, CO, Ni, or Mn); lithium nickel-manganese-cobalt oxide $Li_{1+x}(Ni_aCo_bMn_c)_{1-x}O_2$ (x=0~0.03, a=0.3 to 0.95, b=0.01 to 0.35, c=0.01 to 0.5, a+b+c=1); oxide $Lia[Ni_bCo_cMn_dAl_e]_{1-f}Ml_fO_2$ with partial substitution by aluminum in lithium nickel-manganese-cobalt oxide (Ml is at least one selected from the group consisting of Zr, B, W, Mg, Ce, Hf, Ta, La, Ti, Sr, Ba, F, P and S, $0.8 \le a \le 1.2$, $0.5 \le b \le 0.99$, $0<c<0.5$, $0<d<0.5$, $0.01 \le e \le 0.1$, $0 \le f \le 0.1$); oxide $Li_{1+x}(Ni_aCo_bMn_cM_d)_{1-x}O_2$ with partial substitution by other transition metal in lithium nickel-manganese-cobalt oxide (x=0 to 0.03, a=0.3 to 0.95, b=0.01 to 0.35, c=0.01 to 0.5, d=0.001 to 0.03, a+b+c+d=1, M is any one selected from the group consisting of Fe, V, Cr, Ti, W, Ta, Mg and Mo), disulfide compounds; $Fe_2(MoO_4)_3$, but is not limited thereto.

In a specific embodiment of the present disclosure, optionally, the positive electrode may further comprise a conductive material. The conductive material may be porous. Accordingly, the conductive material may include, without limitation, any material having porous and conductive properties, and for example, may include a carbon-based material having porous properties. The carbon-based material may include carbon black, graphite, graphene, activated carbon, carbon fibers and carbon nanotubes (CNT). Additionally, the conductive material may include metallic conductive materials such as metal fibers, metal mesh: metallic powder such as copper, silver, nickel, aluminum: or organic conductive materials such as polyphenylene derivatives. The exemplary conductive materials may be used alone or in combination.

In a specific embodiment of the present disclosure, optionally, the positive electrode may further comprise a binder. The binder may include a thermoplastic resin or a thermosetting resin. More specifically, the binder may include at least one of polyethylene, polypropylene, polytetrafluoro ethylene (PTFE), polyvinylidene fluoride (PVDF), styrene-butadiene rubber, tetrafluoroethylene-perfluoroalkylvinylether copolymer, polyvinylidene fluoride-hexafluoropropylene copolymer, polyvinylidene fluoride-chlorotrifluoroethylene copolymer, ethylene-tetrafluoroethylene copolymer, polychlorotrifluoroethylene, polyvinylidene fluoride-pentafluoro propylene copolymer, propylene-tetrafluoroethylene copolymer, ethylene-chlorotrifluoroethylene copolymer, polyvinylidene fluoride-hexafluoropropylene-tetra fluoroethylene copolymer, polyvinylidene fluoride-perfluoromethylvinylether-tetrafluoro ethylene copolymer or ethylene-acrylic acid copolymer, but is not limited thereto, and may include any type of binder available in the corresponding technical field.

In a specific embodiment of the present disclosure, the positive electrode active material may be included in an amount of 80 weight % to 99 weight % based on the total weight of solids in the positive electrode slurry.

In a specific embodiment of the present disclosure, the solvent used in the positive electrode slurry may comprise an organic solvent, for example, N-methyl-2-pyrrolidone (NMP), and when the positive electrode active material and optionally the binder and the conductive material are included, the solvent may be used in a sufficient amount for desirable viscosity. For example, the solvent may be included in such an amount that the concentration of solids in the slurry comprising the positive electrode active material, and optionally the binder and the conductive material is 50 weight % to 95 weight %, and preferably 70 weight % to 90 weight %.

In a specific embodiment of the present disclosure, the positive electrode may be manufactured by mixing the positive electrode active material and optionally the conductive material, and optionally the binder to prepare a composition for forming a positive electrode active material layer, coating the composition on at least one surface of the positive electrode current collector, drying and rolling. Another method for manufacturing the positive electrode may include casting the composition for forming a positive electrode active material layer on a support, peeling a film off from the support and laminating the film on the positive electrode current collector.

In a specific embodiment of the present disclosure, the negative electrode may be manufactured by forming a negative electrode material layer on a negative electrode current collector. The negative electrode material layer may be formed by coating a negative electrode slurry comprising a negative electrode active material, a binder, a conductive material and a solvent on the negative electrode current collector, drying and rolling.

In a specific embodiment of the present disclosure, the negative electrode active material may comprise at least one of lithium metal, carbon materials capable of reversible intercalation/deintercalation of lithium ions, metals or alloys of metals and lithium, metal composite oxide, materials capable of doping and dedoping lithium or transition metal oxide.

The carbon material capable of reversible intercalation/deintercalation of lithium ions as an example of the negative electrode active material may include, without limitation, any type of carbon-based negative electrode active material commonly used in the lithium ion secondary battery, and its typical example may include at least one of crystalline carbon or amorphous carbon. Examples of the crystalline carbon may include graphite such as amorphous, platy, flake, spherical or fibrous natural graphite or artificial graphite, and examples of the amorphous carbon may include soft carbon (low temperature sintered carbon) or hard carbon, mesophase pitch carbide and sintered cokes.

The metal or alloy of the metal and lithium as an example of the negative electrode active material may include at least one metal of Cu, Ni, Na, K, Rb, Cs, Fr, Be, Mg, Ca, Sr, Si, Sb, Pb, In, Zn, Ba, Ra, Ge, Al or Sn or alloys of the metals and lithium.

The metal composite oxide as an example of the negative electrode active material may include at least one of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$) or $Sn_xMe_{1-x}Me'_yO_z$ (Me: Mn, Fe, Pb, Ge; Me': Al, B, P, Si, Group 1, 2 and 3 elements in the periodic table, halogen: $0<x \le 1$; $1 \le y \le 3$; $1 \le z \le 8$).

The material capable of doping and dedoping lithium as an example of the negative electrode active material may include Si, $SiO_x$ ($0 \le x \le 2$), Si—Y alloy (the Y is at least one of alkaline metals, alkaline earth metals, Group 13 elements, Group 14 elements, transition metal or rare earth elements, and is not Si), Sn, $SnO_2$, Sn—Y (the Y is at least one of alkaline metals, alkaline earth metals, Group 13 elements, Group 14 elements, transition metal or rare earth elements, and is not Sn), and at least one of them may be mixed with $SiO_2$. The Y may include at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te or Po.

The transition metal oxide as an example of the negative electrode active material may include lithium containing titanium composite oxide (LTO), vanadium oxide and lithium vanadium oxide.

In a specific embodiment of the present disclosure, the negative electrode active material may be included in an amount of 80 weight % to 99 weight % based on the total weight of solids in the negative electrode slurry.

In a specific embodiment of the present disclosure, optionally, the negative electrode may further comprise a binder. The binder is the component that assists the bonding between the active material and the current collector, or among the active material, the conductive material and the current collector, and is usually added in an amount of 1 to 30 weight % based on the total weight of solids in the negative electrode slurry. Examples of the binder may include polyvinylidenefluoride (PVDF), polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluoro rubber and their copolymers.

In a specific embodiment of the present disclosure, optionally, the negative electrode may further comprise a conductive material. The conductive material is the component used to improve the conductivity of the negative electrode active material, and may be added in an amount of 1 to 20 weight % based on the total weight of solids in the negative electrode slurry. The conductive material may be identical to or different from the conductive material used to manufacture the positive electrode, and may include, for example, carbon powder of carbon black, acetylene black (or denka black), ketjen black, channel black, furnace black, lamp black or thermal black: graphite powder having well-developed crystal structure such as natural graphite, artificial graphite or graphite; conductive fibers such as carbon fibers or metal fibers: metal powder such as fluoro carbon, aluminum and nickel powder: conductive whiskers such as zinc oxide, potassium titanate; conducting metal oxide such as titanium oxide; and conductive materials such as polyphenylene derivatives.

In a specific embodiment of the present disclosure, the solvent used in the negative electrode slurry may comprise an organic solvent, for example, water, NMP or alcohol, and when the negative electrode active material and optionally the binder and the conductive material are included, the solvent may be used in a sufficient amount for desirable viscosity. For example, the solvent may be included in such an amount that the concentration of solids in the slurry comprising the negative electrode active material, and optionally the binder and the conductive material is 50 weight % to 95 weight %, and preferably 70 weight % to 90 weight %.

In a specific embodiment of the present disclosure, when the nonaqueous electrolyte solution is used, the nonaqueous electrolyte solution may comprise a lithium salt and an organic solvent, and may further comprise an additive commonly used in the corresponding technical field.

In a specific embodiment of the present disclosure, the lithium salt may have a cation and an anion, wherein the cation may comprise $Li^+$, and the anion may comprise at least one of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$; $(CF_3)_4PF_2^-$, $(CF_3)_5PF^-$, $(CF_3)_6P^-$, $CF_3SO_3^-$, $C_4F_9SO_3^-$; $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ or $(CF_3CF_2SO_2)_2N^-$.

In a specific embodiment of the present disclosure, the exemplary lithium salts may be used alone or in combination as necessary. The lithium salt may be included in the nonaqueous electrolyte solution at the concentration of 0.01M to 5M or 0.1M to 5M or 0.1M to 3M and the concentration may be appropriately changed within the commonly used range.

In a specific embodiment of the present disclosure, the organic solvent may include any organic solvent that may minimize the oxidation induced decomposition during charging and discharging of the secondary battery and exert the intended characteristics together with the additive. For example, the organic solvent may include at least one of an ether-based solvent, an ester-based solvent or an amide-based solvent.

In a specific embodiment of the present disclosure, among the exemplary organic solvents, the ether-based solvent may include at least one of dimethylether, diethylether, dipropyl ether, methylethylether, methylpropyl ether or ethylpropyl ether, but is not limited thereto.

In a specific embodiment of the present disclosure, the ester-based solvent may comprise a cyclic carbonate compound, a linear carbonate compound, a linear ester compound, a cyclic ester compound or a mixture thereof.

In a specific embodiment of the present disclosure, specific examples of the cyclic carbonate compound may include ethylene carbonate (EC), propylene carbonate (PC), 1,2-butylene carbonate, 2,3-butylene carbonate, 1,2-pentylenecarbonate, 2,3-pentylene carbonate, vinylene carbonate, fluoroethylene carbonate (FEC) or a mixture thereof.

In a specific embodiment of the present disclosure, specific examples of the linear carbonate compound may typically include dimethyl carbonate (DMC), diethyl carbonate (DEC), dipropyl carbonate, ethylmethyl carbonate (EMC), methylpropyl carbonate, ethylpropyl carbonate or a mixture thereof, but is not limited thereto.

In a specific embodiment of the present disclosure, specific examples of the linear ester compound may include methyl acetate, ethyl acetate, propyl acetate, methyl propionate, ethyl propionate, propyl propionate, butyl propionate or a mixture thereof, but is not limited thereto.

In a specific embodiment of the present disclosure, specific examples of the cyclic ester compound may include γ-butyrolactone, γ-valerolactone, γ-caprolactone, σ-valerolactone, ε-caprolactone or a mixture thereof, but is not limited thereto.

In a specific embodiment of the present disclosure, the cyclic carbonate-based compound is a high viscosity organic solvent and thus dissolves the lithium salt in the electrolyte well due to high dielectric constant. Accordingly, when the cyclic carbonate-based compound is mixed with the low viscosity low dielectric constant linear carbonate-based compound such as dimethyl carbonate and diethyl carbonate and the linear ester-based compound at an optimal ratio, the nonaqueous electrolyte solution having high electrical conductivity may be prepared.

The separator for a lithium secondary battery according to an aspect of the present disclosure may achieve effective transport of lithium ions, reduce the side reaction at the interface between the separator for a lithium secondary battery comprising the ion-conducting polymer material and the electrode, and remarkably lower the resistance rise in the battery at the initial stage. As a result, a battery using the same has improved output density characteristics and a decrease in irreversible capacity and its consequential improved rate characteristics, and thus it may be possible to reduce the time required to charge or discharge the battery, and improve the charge discharge life. Accordingly, it may be used in the industrial field requiring fast charging, for example, mobile devices including mobile phones, laptop computers, digital cameras, camcorders or the like, electric vehicle including hybrid electric vehicle (HEV), plug-in HEV (PHEV) or the like, and medium- and large-size energy storage systems.

Hereinafter, example, comparative example and experimental example are presented to help understanding of the present disclosure. However, the following experimental example is an experimental example about the configuration and effect of the present disclosure, and the scope of protection and effect of the present disclosure are not limited thereto.

Example, Manufacture of Separator

Example 1

PVDF-HFP (molecular weight (Mw) 500,000 g/mol, HFP content 15 wt %) and alumina (particle size 0.5 μm) were added to acetone at a weight ratio of 22.5:77.5 to prepare a slurry for forming a first region having 20 wt % solids.

Subsequently, PVDF-HFP (molecular weight (Mw) 500,000 g/mol, HFP content 15 wt %) and alumina (particle size 0.5 μm) were added to acetone at a weight ratio of 25:75 to prepare a slurry for forming a second region having 20 wt % solids.

A polymer film made of polyethylene (thickness 9 μm, porosity 45 vol %, air permeation time 60 sec/100 cc) was prepared, and the slurries for forming the first and second regions were coated in a sequential order as shown in FIG. 1 and dried at 23° C. in the humidity condition of relative humidity of 45% to obtain a separator.

Example 2

PVDF-HFP (molecular weight (Mw) 500,000 g/mol, HFP content 15 wt %) and alumina (particle size 0.5 μm) were added to acetone at a weight ratio of 20:80 to prepare a slurry for forming a first region having 20 wt % solids.

Subsequently, PVDF-HFP (molecular weight (Mw) 500,000 g/mol, HFP content 15 wt %) and alumina (particle size 0.5 (m) were added to acetone at a weight ratio of 25:75 to prepare a slurry for forming a second region having 20 wt % solids.

A polymer film made of polyethylene (thickness 9 μm, porosity 45 vol %, air permeation time 60 sec/100 cc) was prepared, and the slurries for forming the first and second regions were coated in a sequential order as shown in FIG. 1 and dried at 23° C. in the humidity condition of relative humidity of 45% to obtain a separator.

Comparative Example 1

PVDF-HFP (molecular weight (Mw) 500,000 g/mol, HFP content 15 wt %) and alumina (particle size 0.5 μm) were added to acetone at a weight ratio of 25:75 to prepare a slurry for forming a coating layer having 20 wt % solids.

A polymer film made of polyethylene (thickness 9 μm, porosity 45 vol %, air permeation time 60 sec/100 cc) was prepared, coated with the slurry, and dried at 23° C. in the humidity condition of relative humidity of 45% to obtain a separator.

Experimental Example, Evaluation of Properties of Separator

Figure 3:
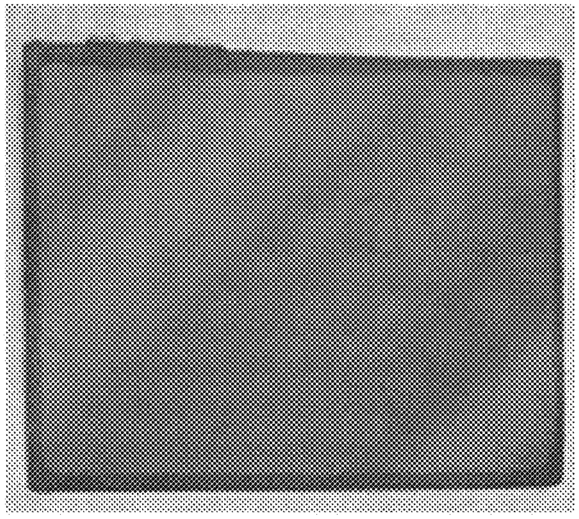
FIG. 3 is a photographic image of a negative electrode surface of a battery of example 1.
Figure 4:
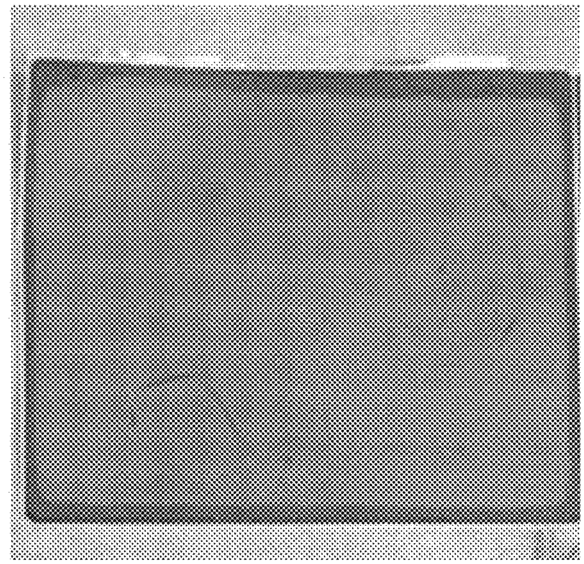
FIG. 4 is a photographic image of a negative electrode surface of a battery of example 2.
Figure 5:
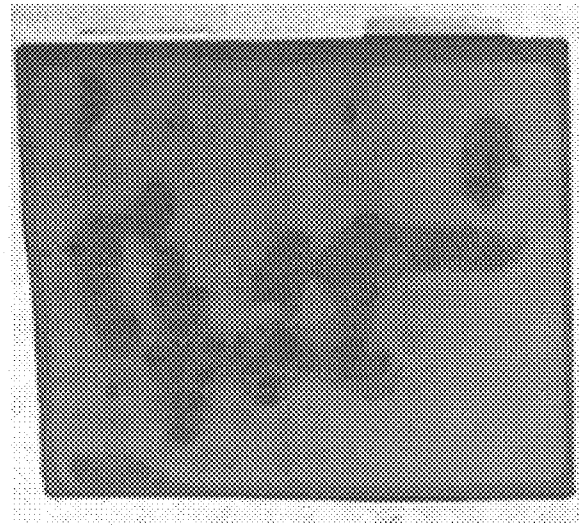
FIG. 5 is a photographic image of a negative electrode surface of a battery of comparative example 1.

The properties of the manufactured separator are evaluated by the following evaluation method, and the results are shown in the following Table 1 and FIGS. 3 to 5.

[Evaluation Results]

TABLE 1

| | Thickness (μm) | Air permeability (sec/100 cc) First region | Air permeability (sec/100 cc) Second region | Electrode adhesion strength (gf/25 mm) First region | Electrode adhesion strength (gf/25 mm) Second region | Wettability evaluation Monocell central region wetting |
|---|---|---|---|---|---|---|
| Example 1 | 17.3 | 161 | 187 | 103 | 134 | ○ (FIG. 3) |
| Example 2 | 17.5 | 139 | 198 | 82 | 143 | ○ (FIG. 4) |
| Comparative example1 | 17.3 | 189 | 191 | 138 | 142 | X (FIG. 5) |

[Evaluation Method]

1. Air Permeation Time

The air permeability of the separator was measured using an air permeability measurement machine (Asahi Seiko, EGO-IT) in accordance with JIS P8117. Meanwhile, an air permeation time measurement sample was obtained by dividing the separator into first and second regions using a knife to measure the air permeability of each of the first and second regions.

2. Electrode Adhesion Strength

An active material [natural graphite and artificial graphite (weight ratio 5:5)], a conductive material [super P] and a binder [polyvinylidene fluoride (PVdF)] were mixed at a weight ratio of 92:2:6 and dispersed in water, and then coated with the width of 250 mm on a copper foil to manufacture a negative electrode.

The separator manufactured in each of examples 1 and 2 and comparative example 1 was prepared.

The prepared separator was divided into a first region and a second region using a knife.

The prepared separator and the negative electrode were stacked and inserted in between 100 μm thick PET films and then adhered using a roll lamination machine. In this instance, the conditions of the roll lamination machine were 60° C., the pressure of 2.4 kgf/mm and the rate of 5 m/min.

The separator and the negative electrode adhered to each other were tailored into the width of 25 mm and the length of 70 mm, the ends of the separator and the negative electrode were mounted on UTM machine (Instron), force was applied 180° at the measurement rate of 300 mm/min to separate the negative electrode from the separator adhered to the negative electrode, and the force required to peel was measured.

3. Determination of Electrolyte Wettability (1) Manufacture of Negative Electrode Artificial graphite as a negative electrode active material, carbon black as a conductive material, carboxymethylcellulose (CMC) as a dispersant, and styrene-butadiene rubber (SBR, Zeon BM-L301) as a binder were mixed with water at a weight ratio of 95.8:1:1.2:2 to prepare a negative electrode slurry. The negative electrode slurry was coated with the thickness of 50 um on a copper foil (Cu-foil) to form a thin electrode plate which in turn, was dried at 135° C. for 3 hours or more and rolled (pressing) to manufacture a negative electrode.

(2) Manufacture of Positive Electrode $LiCoO_2$ as a positive electrode active material, carbon black as a conductive material and polyvinylidene fluoride (PVDF) as a binder were mixed with N-methyl-2-pyrrolidone (NMP) at a weight ratio of 98:1:1 to prepare a positive electrode slurry. The positive electrode slurry was coated with the thickness of 20 um on an aluminum foil to form a thin electrode plate which in turn, was dried at 135° C. for 3 hours or more and rolled (pressing) to manufacture a positive electrode.

(3) Manufacture of Lithium Secondary Battery

Subsequently, the negative electrode and the positive electrode were stacked with the manufactured separator interposed between to prepare a stack type electrode assembly, the electrode assembly was inserted into a pouch case, and an electrolyte solution in which 1M $LiPF_6$ is dissolved in a mixed solvent of ethylene carbonate (EC) and diethyl carbonate (DEC) at a volume ratio of 30:70 was injected to manufacture a lithium secondary battery.

After disassembling the manufactured secondary battery at SOC 60, wetting was observed through negative electrode surface observation. When wetting is good, uniform state of charge is observed over the entire surface of the negative electrode (FIGS. 3 and 4), but when wetting is bad, uncoated regions (dark regions) on the negative electrode surface (FIG. 5) are observed.

While the present disclosure has been hereinabove described with regard to a limited number of embodiments and drawings, the present disclosure is not limited thereto, and it is apparent that a variety of changes and modifications may be made by those skilled in the art within the technical aspect of the present disclosure and the scope of the appended claims and their equivalents.

DESCRIPTION OF REFERENCE NUMERALS

100 Separator
110 Polymer substrate
120 Organic/inorganic composite coating layer
121 First region
122 Second region
300 Coater
500 Dryer
400 Cutter

What is claimed is:

1. A separator for an electrochemical device, comprising:
a porous polymer substrate; and
a porous organic/inorganic composite coating layer on at least one surface of the porous polymer substrate,
wherein the organic/inorganic composite coating layer comprises a first region and a second region, and
wherein each of the first region and the second region independently comprises inorganic particles and a binder material, a content ratio of the inorganic particles in the first region according to Equation 1 is higher than a content ratio of the inorganic particles in the second region according to Equation 2:

$$\text{content ratio of the inorganic particles in the first region (wt\%)} = [\text{an amount of the inorganic particles in the first region} / (\text{an amount of the inorganic particles in the first region} + \text{an amount of the binder material in the first region})] \times 100, \quad \text{Equation 1}$$

$$\text{content ratio of the inorganic particles in the second region (wt\%)} = [\text{an amount of the inorganic particles in the second region} / (\text{an amount of the inorganic particles in the second region} + \text{an amount of the binder material in the second region})] \times 100. \quad \text{Equation 2}$$

2. The separator for the electrochemical device according to claim 1, wherein the porous organic/inorganic composite coating layer has a higher porosity of the first region than the second region.

3. The separator for the electrochemical device according to claim 1, wherein the content ratio of the inorganic particles in the first region is higher than the content ratio of the inorganic particles in the second region, and the content ratio of the inorganic particles in the first region is 70 wt % or more and 90 wt % or less.

4. The separator for the electrochemical device according to claim 1, wherein the content ratio of the inorganic particles in the second region is lower than the content ratio of the inorganic particles in the first region, and the content ratio of the inorganic particles in the second region is 85 wt % or less.

5. The separator for the electrochemical device according to claim 1, wherein the second region is present at part of a periphery of the first region wherein at least part of a side of the first region is exposed to the surface, and the second region is present with a boundary in contact with the first region.

6. The separator for the electrochemical device according to claim 5, wherein the second region is a single integrated region, or is divided into two or more units, wherein the units are arranged wherein any one unit is spaced apart from the other unit(s).

7. The separator for the electrochemical device according to claim 5, wherein the first region is present in a rectangular shape on an inner side of the surface of the porous polymer substrate, each unit of the second region is present on at least one side of the first region and an opposite side, and the second region is not present on two other sides.

8. The separator for the electrochemical device according to claim 6, wherein the separator has a rectangular shape having an aspect ratio of more than 1, and the second region is present on each of two short sides of the separator.

9. An electrochemical device, comprising:
an electrode assembly comprising a positive electrode, a negative electrode and a separator interposed between the positive electrode and the negative electrode,
wherein the separator is defined in claim 1.

10. The electrochemical device according to claim 9, wherein the electrochemical device is a lithium ion secondary battery.

11. A method for manufacturing the separator for the electrochemical device defined in claim 1, wherein the method is performed by a roll-to-roll process of continuously feeding a long strip shaped porous polymer substrate, the method comprising:
forming a second region having a predetermined width at each of two ends in a widthwise direction perpendicular to a transport direction of the porous polymer substrate, and
forming a first region between the second region at each of the two ends to obtain a separator strip comprising the composite coating layer having the first region and the second region.

12. The method for manufacturing the separator for the electrochemical device according to claim 11, wherein the forming of the first region and second region at each of the two ends is performed by coating each of a slurry for forming the first region and a slurry for forming the second region on each defined region using a double slot die.

13. The method for manufacturing the separator for the electrochemical device according to claim 11, wherein the separator strip is cut into a predetermined width to obtain the separator, and the side of the first region is exposed through two ends of the porous polymer substrate in the transport direction.

* * * * *